US008688257B2

(12) United States Patent
Kommareddy et al.

(10) Patent No.: US 8,688,257 B2
(45) Date of Patent: Apr. 1, 2014

(54) PROGRAMMING APPARATUS

(75) Inventors: Surya Kommareddy, Davis, CA (US); Bingyan Zhao, Davis, CA (US)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 535 days.

(21) Appl. No.: 12/604,128

(22) Filed: Oct. 22, 2009

(65) Prior Publication Data
US 2010/0114359 A1 May 6, 2010

Related U.S. Application Data

(60) Provisional application No. 61/109,741, filed on Oct. 30, 2008.

(51) Int. Cl.
*G05B 19/19* (2006.01)
(52) U.S. Cl.
USPC .......................................................... 700/173
(58) Field of Classification Search
None
See application file for complete search history.

(56) References Cited

U.S. PATENT DOCUMENTS

| 5,400,260 | A | * | 3/1995 | Matsumura et al. | 700/180 |
| 6,438,445 | B1 | * | 8/2002 | Yoshida et al. | 700/173 |
| 2006/0247804 | A1 | * | 11/2006 | Kamiya et al. | 700/86 |
| 2009/0165126 | A1 | * | 6/2009 | Jung et al. | 726/21 |

FOREIGN PATENT DOCUMENTS

JP 2003-177810 A 6/2003

OTHER PUBLICATIONS

Tolouei-Rad and Payeganeh, "A Hybrid Approach to Automatic Generation of NC Programs", Journal of Achievements in Materials and Manufacturing Engineering, vol. 14, Issue 1-2, Jan.-Feb. 2006, pp. 83-89.*

* cited by examiner

*Primary Examiner* — Kakali Chaki
*Assistant Examiner* — Walter Hanchak
(74) *Attorney, Agent, or Firm* — Westerman, Hattori, Daniels & Adrian, LLP

(57) ABSTRACT

A programming apparatus has a parameter storage section for storing parameters related to the operation control of an operating mechanism of an NC machine tool, a CL data storage section for storing CL data including data relating to a moving position of a tool and machining conditions, an NC program generating section for referring to the parameters in the parameter storage section, and generating an NC program form the CL data in the CL data storage section, and NC program storage section for storing the generated NC program. The NC program generating section checks whether the machining condition data included in the CL data is suitable by referring to the parameters, and, when it is not suitable, corrects the machining condition data using the parameters and then generates an NC program based on the CL data in which the corrected machining condition data is included.

4 Claims, 5 Drawing Sheets

Fig. 2

| Identification number (Parameter name) | Set value |
|---|---|
| 1 (Maximum feed speed of tool) | * * * |
| 2 (Maximum rotational speed of spindle) | * * * |
| 3 (Control type of tool center point control) | * * * |
| 4 ( * * * ) | * * * |
| ⋮ | ⋮ |

Fig. 3

| Item to be referred to | Identification number (Parameter name) |
|---|---|
| Feed speed of tool | 1 (Maximum feed speed of tool) |
| Rotational speed of spindle | 2 (Maximum rotational speed of spindle) |
| Control type of tool center point control | 3 (Control type of tool center point control) |
| * * * | 4 ( * * * ) |
| ⋮ | ⋮ |

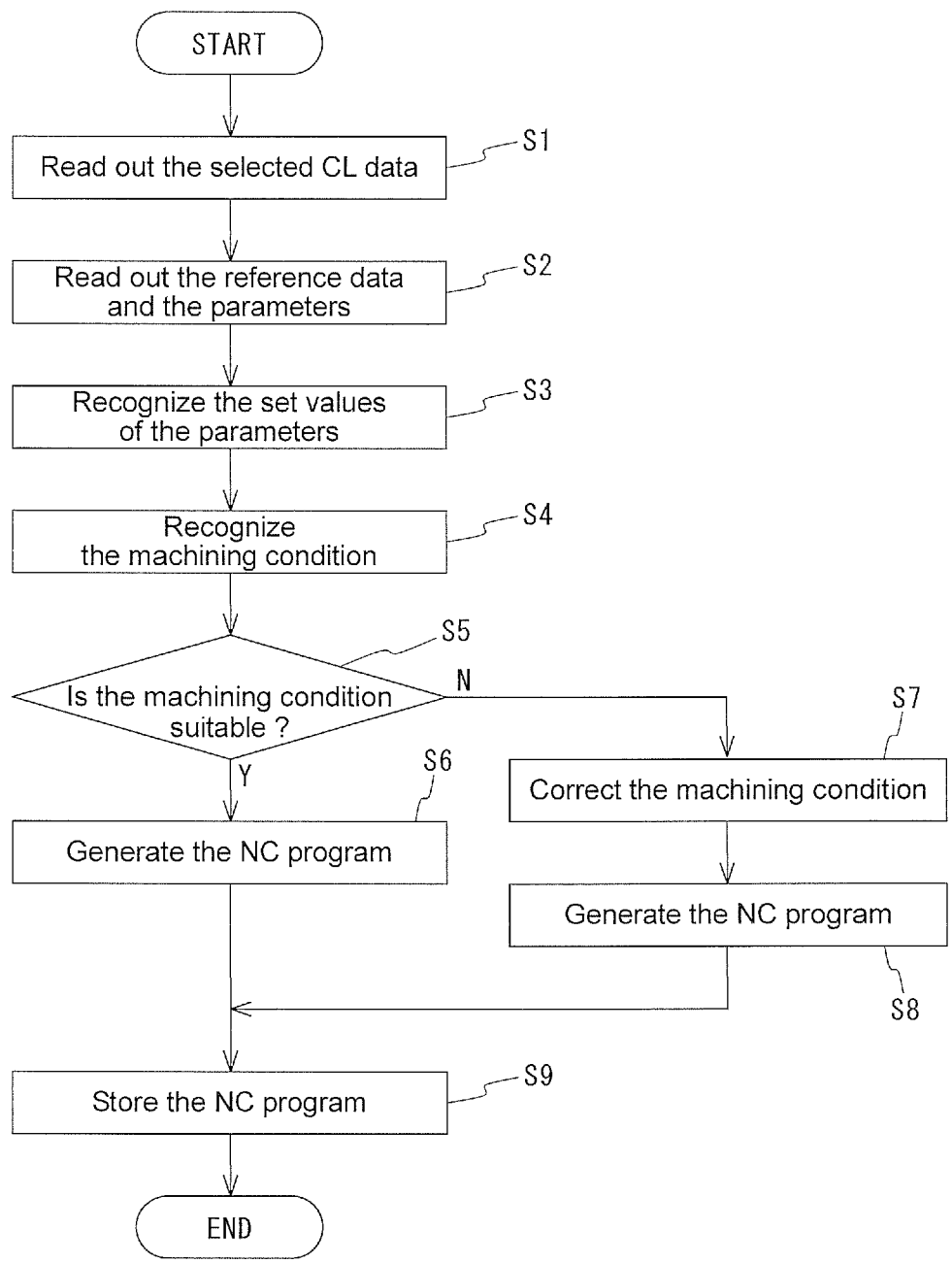

PROGRAMMING APPARATUS

TECHNICAL FIELD

The present invention relates to a programming apparatus for generating from CL data generated in advance an NC program for controlling an operating mechanism of an NC machine tool.

BACKGROUND ART

Said NC machine tool has an operating mechanism for relatively moving a tool and a workpiece to machine the workpiece and a control device for controlling the operating mechanism. The control device is configured with a program storage section for storing an NC program, a parameter storage section for storing parameters related to the operation control of the operating mechanism (for example, the maximum feed speed of a tool and the maximum rotational speed of a spindle which holds a tool or a workpiece), and a drive control section for controlling the operating mechanism based on the NC program stored in the program storage section and the parameters stored in the parameter storage section.

Said NC program is generated by a programming apparatus or the like, and as such a programming apparatus, for example, a programming apparatus disclosed in the Japanese Unexamined Patent Application Publication No. 2003-177810 has been conventionally known.

This programming apparatus is configured with: a CL data generating section for generating, based on data relating to workpiece shape before machining, workpiece shape after machining, material of workpiece, tools, and machining conditions (for example, a feed speed of a tool, a rotational speed of a spindle, etc.), CL data including the moving positions of tools used for the machining of the workpiece and machining conditions (said feed speed and rotational speed); a CL data storage section for storing the generated CL data; a machine-tool data storage section for storing data relating to an NC machine tool for performing the machining of the workpiece; an NC program generating section for generating an NC program based on the data stored in the CL data storage section and in the machine-tool data storage section; and an NC program storage section for storing the generated NC program.

SUMMARY OF INVENTION

Technical Problem

By the way, said parameters are set according to the specification and performance of the NC machine tool, the state of the NC machine tool affected by secular change, etc, and usually vary depending on the individual NC machine tool. Meanwhile, in the above conventional programming apparatus, the machining conditions included in the CL data (machining conditions commanded in the NC program) are set regardless of said parameters.

Hence, in the above conventional programming apparatus, it is possible that an NC program including command values that are not suitable in relation to set values of the parameters may be generated, for example, a feed speed of a tool commanded in the NC program could exceed the maximum feed speed set in the parameters, or, a rotational speed of a spindle commanded in the NC program could exceed the maximum rotational speed set in the parameters.

In the case where the command values of the NC program are not suitable in relation to the set values of the parameters, the drive control section executes an alarm process to stop the relative movement of a tool and workpiece (the machining of the workpiece). Therefore, when the NC machine tool is controlled based on the NC program generated by the above conventional programming apparatus, in the case where the command values of the NC program are not in consistency with the set values of the parameters, the machining of a workpiece is forced to be stopped on the way by an alarm process. Further, if the operator checks and corrects the generated NC program in order to prevent such a problem from occurring, then the checking and correcting operations take time, and therefore, it is not possible to efficiently generate an NC program having no problem.

The present invention has been achieved in view of the above-described circumstances, and an object of the present invention is to provide a programming apparatus capable of generating an NC program including command values that are suitable in relation to set values of parameters.

Solution to Problem

The present invention, for achieving the above-described object, relates to a programming apparatus for generating an NC program which is used in an NC machine tool having an operating mechanism for relatively moving a tool and a workpiece and a control device for controlling the operating mechanism, wherein the programming apparatus comprises: a parameter storage section for storing parameters related to the operation control of the operating mechanism; a CL data storage section for storing CL data including at least data relating to the moving position of the tool and data relating to machining conditions; an NC program generating section for referring to the parameters stored in the parameter storage section, and generating the NC program from the CL data stored in the CL data storage section; and an NC program storage section for storing the NC program generated by the NC program generating section, and the NC program generating section is configured to check, by referring to the parameters, whether the machining condition data included in the CL data is suitable, and, on the one hand, when determining that it is suitable, generate an NC program based on the CL data, and, on the other hand, when determining that it is not suitable, correct the machining condition data using the parameters and generate an NC program based on the CL data in which the corrected machining condition data is included.

According to this programming apparatus, first, parameters related to the operation control of the operating mechanism are stored in advance in the parameter storage section, and CL data including at least data relating to the moving position of a tool and data relating to machining conditions is stored in advance in the CL data storage section.

Here, said parameters relates to, for example, the type of the NC machine tool (for example, whether the NC machine tool is a lathe or a machining center), the structure of the NC machine tool (for example, how the axis configuration of the NC machine tool is configured), the maximum operating amount in the direction along a feed axis (linear movement and rotational movement), whether the control type of tool center point control is type 1 or type 2, the maximum feed speed of a tool, the maximum rotational speed of a spindle which holds a tool or a workpiece, etc. As the machining conditions, for example, a feed speed of a tool, a rotational speed of a spindle, or whether coolant is supplied can be provided. It is noted that the control type of tool center point control indicates whether, in the case where the NC machine tool is, for example, a five-axis machine tool, the moving position of a tool is commanded by the rotational angular position around the axis of rotation (type 1) or is commanded by the vector (tilt) of the tool (type 2).

Then the NC program generating section refers to the parameters stored in the parameter storage section, and generates an NC program from the CL data stored in the CL data storage section. Specifically, first, the parameters are referred to, and a check is made whether the machining condition data included in the CL data is suitable. In the case where the machining condition data in the CL data does not exceed the maximum values set in the parameters and the machining condition data included in the CL data is suitable, for example, in the case where a feed speed of a tool in the CL data is within the maximum feed speed that is the set value of the parameter, or in the case where a rotational speed of a spindle in the CL data is within the maximum rotational speed that is the set value of the parameter, an NC program is generated based on the CL data stored in the CL data storage section.

On the other hand, in the case where the machining condition data in the CL data exceed the maximum values set in the parameters and the machining condition data included in the CL data is not suitable, for example, in the case where a feed speed of a tool in the CL data exceeds the maximum feed speed that is the set value of the parameter, or in the case where a rotational speed of the spindle in the CL data exceeds the maximum rotational speed that is the set value of the parameter, the machining condition data is corrected using the parameters. Thereby, for example, the feed speed of the tool in the CL data is set to be equal to or less than the maximum feed speed, or the rotational speed of the spindle in the CL data is set to be equal to or less than the maximum rotational speed, and thereby the values of the machining condition data in the CL data are set to be equal to or less than the maximum values set in the parameters (set to values not exceeding the maximum values). Thereafter, an NC program is generated based on the CL data in which the machining condition data thus corrected is included.

Then, the generated NC program is stored in the NC program storage section. The stored NC program is output to the outside, and the NC machine tool is controlled in accordance with this NC program.

Thus, according to the programming apparatus of the present invention, the machining condition data included in the CL data is compared with the parameters stored in the parameter storage section, and a determination is made whether the machining condition data in the CL data is suitable in relation to the set values of the parameters. When the determination is made that it is not suitable, the machining condition data is corrected and then an NC program is generated. Therefore, an NC program in which the parameters are reflected, that is, an NC program including command values that are suitable in relation to the set values of the parameters can be generated. Therefore, it is possible to prevent the machining of a workpiece from being stopped on the way by an alarm process caused by an NC program including command values that are unsuitable in relation to the set values of the parameters being executed by the control device. Further, it is possible to efficiently generate a NC program having no problem because operations for checking and correcting the generated NC program are not necessary.

The programming apparatus may be configured in the following manner instead of the above-described configuration. In this case, the programming apparatus comprises: a parameter storage section for storing parameters related to the operation control of the operating mechanism; a CL data storage section for storing CL data including only data relating to the moving position of the tool; a machining condition data storage section for storing data relating to machining conditions; an NC program generating section for referring to the parameters stored in the parameter storage section and the machining condition data stored in the machining condition data storage section, and generating the NC program from the CL data stored in the CL data storage section; and an NC program storage section for storing the NC program generated by the NC program generating section, and the NC program generating section is configured to refer to the parameters, set machining condition data according to these parameters, and then generate an NC program.

In this programming apparatus, the machining condition data stored in the machining condition data storage section and the parameters stored in the parameter storage section are referred to, and machining condition data according to the parameters is set, and then an NC program is generated. Therefore, similarly to the above, an NC program including command values that are suitable in relation to the set values of the parameters can be generated. Therefore, in also this programming apparatus, it is possible to prevent the machining of a workpiece from being stopped on the way by an alarm process caused by an NC program including command values that are unsuitable in relation to the set values of the parameters being executed by the control device. Further, it is possible to efficiently generate a NC program having no problem because operations for checking and correcting the generated NC program are not necessary.

Further, the programming apparatus may be provided in the control device. In this case, when the parameters in the parameter storage section are used by the control device for the operation control of the operation mechanism, it is possible to always refer to the latest parameters and then generate an NC program. Thereby, it is possible to surely generate a suitable NC program. Moreover, the CL data storage section may be configured so that CL data generated by an external CL data generating device can be stored therein.

Effect of Invention

As described above, according to the programming apparatus of the present invention, it is possible to generate an NC program including command values that are suitable in relation to set values of parameters.

BRIEF DESCRIPTION OF DRAWINGS

FIG. 2 is an illustration showing a data configuration of parameters stored in a parameter storage section of the embodiment;

FIG. 3 is an illustration showing a data configuration of reference data stored in a reference data storage section of the embodiment;

FIG. 4 is a flowchart showing a series of processes in an NC program generating section of the embodiment;

DESCRIPTION OF EMBODIMENT

Figure 1:
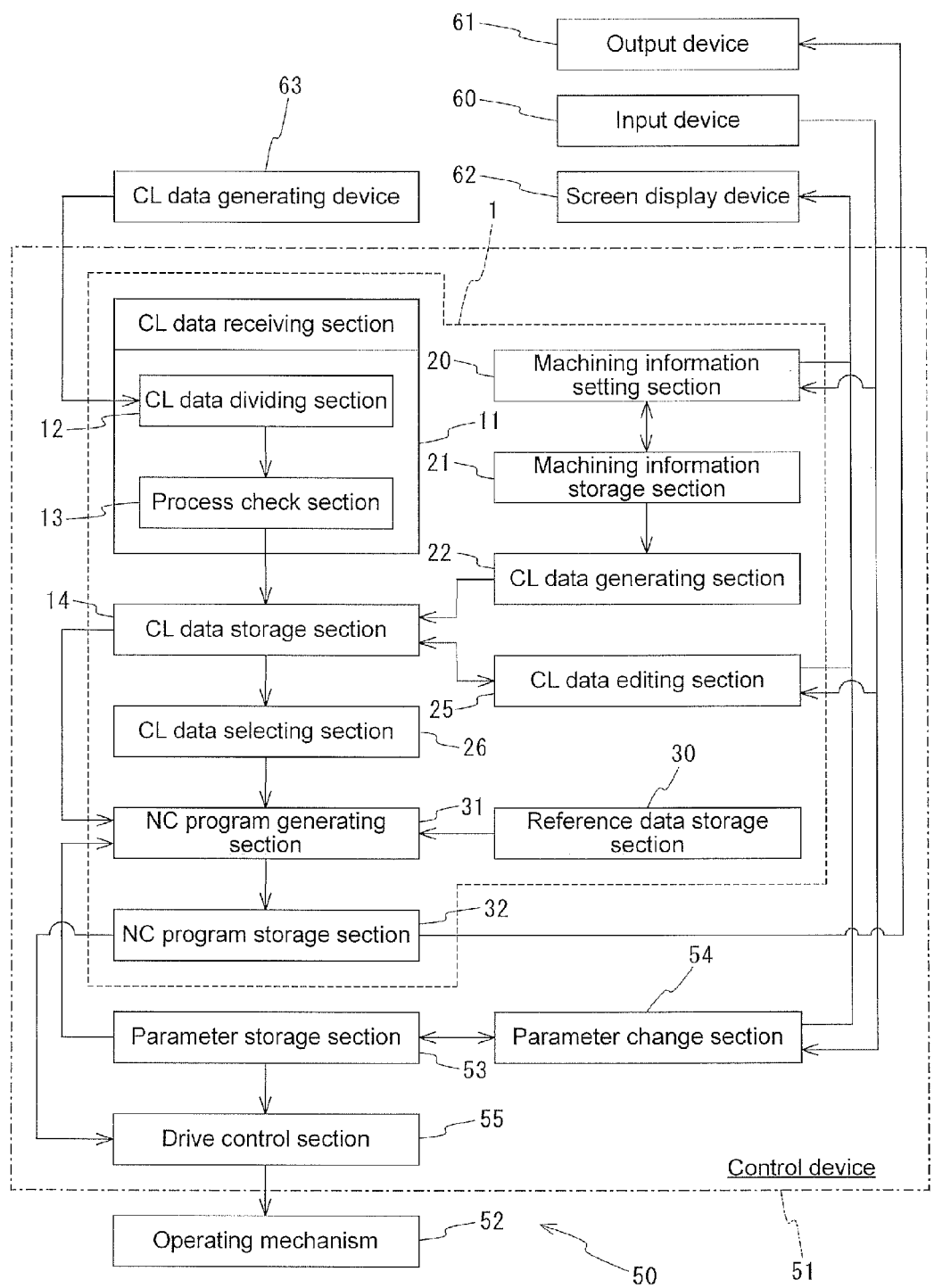
FIG. 1 is a block diagram showing a schematic configuration of a programming apparatus and other components according to one embodiment of the present invention.

Hereinafter, a specific embodiment of the present invention will be explained with reference to the accompanying drawings. FIG. 1 is a block diagram showing a schematic configuration of a programming apparatus and other components according to one embodiment of the present invention.

As shown in FIG. 1, a programming apparatus 1 of the present embodiment is configured with a CL data receiving section 11, a CL data storage section 14, a machining information setting section 20, a machining information storage section 21, a CL data generating section 22, a CL data editing section 25, a CL data selecting section 26, a reference data storage section 30, an NC program generating section 31, and an NC program storage section 32, and is provided in a control device 51 of an NC machine tool 50.

Here, first, the NC machine tool 50 is explained. The NC machine tool 50 has, in addition to the control device 51, an operating mechanism 52 which is controlled by the control device 51, thereby machining a workpiece by relatively moving a tool and the workpiece. In the control device 51, there are provided, in addition to the above-described components, a parameter storage section 53 for storing parameters related to the operation control of the operating mechanism 52, a parameter change section 54 for changing the parameters stored in the parameter storage section 53, and a drive control section 55 for controlling the operating mechanism 52 based on an NC program stored in the NC program storage section 32 and the parameters stored in the parameter storage section 53. Further, an input device 60, an output device 61, a screen display device 62 and a CL data generating device (CAM device) 63 are connected to the control device 51.

As described above, parameters related to the operation control of the operating mechanism 52 are stored in the parameter storage section 53. These parameters relate to, for example, the type of the NC machine tool 50 (for example, the NC machine tool 50 is a lathe or a machining center), the structure of the NC machine tool 50 (for example, how the axis configuration of the NC machine tool 50 is configured), the maximum operating amount in the direction along a feed axis (linear movement and rotational movement), whether the control type of tool center point control is type 1 or type 2, the maximum feed speed of a tool, the maximum rotational speed of a spindle which holds a tool or a workpiece, etc. It is noted that the control type of tool center point control indicates whether, in the case where the NC machine tool 50 is, for example, a five-axis machine tool, the moving position of a tool is commanded by the rotational angular position around the axis of rotation (type 1) or is commanded by the vector (tilt) of the tool (type 2).

Further, as shown in FIG. 2, the parameters are data formed by identification numbers and set values. The parameters are set according to the state of the NC machine tool 50 affected by secular change etc. in addition to the specification and performance of the NC machine tool 50, and can be changed by the parameter change section 54.

As described above, the drive control section 55 controls the operating mechanism 52 based on the NC program stored in the NC program storage section 32 and the parameters stored in the parameter storage section 53. When command values of the NC program are not suitable in relation to the set values of the parameters, for example, when a feed speed of a tool commanded in the NC program exceeds the maximum feed speed set in the parameters, or, when a rotational speed of a spindle commanded in the NC program exceeds the maximum rotational speed set in the parameters, the drive control section 55 executes an alarm process, and thereby stopping the operation of the operating mechanism 52.

Next, the programming apparatus 1 is explained. As described above, the programming apparatus 1 has the CL data receiving section 11, the CL data storage section 14, the machining information setting section 20, the machining information storage section 21, the CL data generating section 22, the CL data editing section 25, the CL data selecting section 26, the reference data storage section 30, the NC program generating section 31, and the NC program storage section 32.

The CL data receiving section 11 is configured with a CL data dividing section 12 and a process check section 13. The CL data receiving section 11 receives, for example, CL data for 5-axis machining which is generated in and input from the CL data generating device 63, and stores the same in the CL data storage section 14. The CL data receiving section 11 is configured to be able to receive CL data generated in various CL data generating devices 63.

Here, said CL data is tool path data, and includes data relating to the moving positions of a tool, tool diameter, tool number for identifying the tool, tool offset amount numbers for identifying the tool offset amount set for the tool, machining conditions, etc. As the machining conditions, for example, a feed speed of a tool, a rotational speed of a spindle, whether coolant is supplied, etc. can be provided.

The CL data dividing section 12 analyzes the CL data input from CL data generating device 63, and checks whether this CL data includes a plurality of machining processes. When determining that this CL data includes a plurality of machining processes, the CL data dividing section 12 divides the input CL data into CL data for each machining process.

The process check section 13 checks whether the CL data which has been determined to include only one machining process by the CL data dividing section 12 or the CL data for each machining process into which the CL data including a plurality of machining processes has been divided by the CL data dividing section 12 relates to a machining process that can be executed in the NC machine tool 50, and stores in the CL data storage section 14 only CL data which has been determined to relate to a machining process that can be executed.

The machining information setting section 20 sets machining information according to input data from the input device 60, and stores the set machining information in the machining information storage section 21. Specifically, the machining information setting section 20 displays a setting screen on the screen display device 62 and sets information (machining information) relating to, for example, a machining process, tool (tool diameter, tool number, tool offset amount number, etc.), machining conditions (feed speed of a tool, rotational speed of a spindle, whether or not coolant is supplied, etc.), workpiece (shape, material, etc.), and the like based on input data from the input device 60.

The CL data generating section 22 generates CL data for 2-axis machining or 2.5-axis machining based on the machining information stored in the machining information storage section 21, and stores the generated CL data in the CL data storage section 14. Similarly to the CL data generated by the CL data generating device 63, the CL data generated by the CL data generating section 22 also includes data relating to moving positions of tools, tool diameter, tool numbers, tool offset amount numbers, machining conditions, etc.

The CL data editing section 25 edits the CL data stored in the CL data storage section 14 according to input data from the input device 60. Specifically, the CL data editing section 25 displays an editing screen on the screen display device 62, and edits (makes additions, deletions or changes to) data relating to, for example, a tool diameter, tool number, tool offset amount number, feed speed of a tool and rotational speed of a spindle based on input data from the input device 60.

The CL data selecting section 26 selects from the CL data stored in the CL data storage section 14 according to input data from the input device 60. Specifically, the CL data selecting section 26 displays a list of the CL data stored in the CL data storage section 14 on the screen display device 62, and selects one or a plurality of CL data based on input data from the input device 60.

As shown in FIG. 3, there is stored, in the reference data storage section 30, reference data defining the corresponding relationship between items to be referred to when generating an NC program and the parameters stored in the parameter storage section 53. The items to be referred to includes also the machining condition data (data relating to machining conditions) included in the CL data. In FIG. 3, as the items to be referred to, for example, a feed speed of a tool, a rotational speed of a spindle and the control type of tool center point control are provided. And, these are related to the identification number for the parameter indicating the maximum feed speed, the identification number for the parameter indicating the maximum rotational speed, and the identification number for the parameter indicating the control type of tool center point control, respectively.

The NC program generating section 31 generates an NC program by executing a series of processes as shown in FIG. 4, based on the CL data selected by the CL data selecting section 26 from the CL data stored in the CL data storage section 14, the reference data stored in the reference data storage section 30, and the parameters stored in the parameter storage section 53.

As shown in FIG. 4, the NC program generating section 31, first, reads out the CL data selected by the CL data selecting section 26 from the CL data storage section 14 (step S1). At this time, in the case where a plurality of CL data are read out (a plurality of CL data are selected by the CL data selecting section 26), the NC program generating section 31 integrates the CL data read out into one CL data, and then executes the processes in and after step S2.

Next, the NC program generating section 31 reads out the reference data stored in the reference data storage section 30 and the parameters stored in the parameter storage section 53 (step S2), and recognizes the set values of the parameters that correspond to the items to be referred to based on the reference data and parameters read out (step S3). Then, the NC program generating section 31 recognizes the machining condition data included in the CL data read out (step S4).

Thereafter, the recognized machining condition data is compared with the set values of the parameters that correspond to machining conditions among the items to be referred to, thereby checking whether the machining condition data is suitable (step S5).

When determining that it is suitable, the NC program generating section 31 refers to the set values of the parameters except the parameters that correspond to machining conditions among the items to be referred to, and generates an NC program from the CL data read out (step S6). On the other hand, when determining that it is not suitable, the NC program generating section 31 corrects the machining condition data using the set values of the parameters that correspond to the machining conditions (step S7), and then refers to the set values of the parameters except the parameters that correspond to machining conditions, and generates an NC program from the CL data in which the corrected machining condition data is included (step S8). Thereafter, the generated NC program is stored in the NC program storage section 32 (step S9), and the above-described series of processes is terminated.

The parameters that correspond to machining conditions among the items to be referred to refer to, for example, the maximum feed speed corresponding to a feed speed of a tool and the maximum rotational speed corresponding to a rotational speed of a spindle. The parameters except the parameters that correspond to machining conditions among the items to be referred to refer to, for example, the parameter indicating the control type of tool center point control.

The case where machining condition data is suitable refers to, for example, the case where a feed speed of a tool in the CL data is within the maximum feed speed that is the set value of the parameter, or the case where a rotational speed of a spindle in the CL data is within the maximum rotational speed that is the set value of the parameter. The case where machining condition data is not suitable refers to, for example, the case where a feed speed of a tool in the CL data exceeds the maximum feed speed that is the set value of the parameter, or the case where a rotational speed of a spindle in the CL data exceeds the maximum rotational speed that is the set value of the parameter.

As a mode of correcting the machining condition data in the CL data, for example, a mode of correcting the feed speed of a tool to a speed that is equal to or less than the maximum feed speed, or correcting the rotational speed of a spindle to a speed that is equal to or less than the maximum rotational speed can be provided.

According to the programming apparatus 1 of the present invention configured as described above, when CL data for 5-axis machining is input from the CL data generating device 63, this CL data is divided into CL data for each machining process by the CL data dividing section 12, and then only CL data relating to machining processes that can be executed in the NC machine tool 50 are stored in the CL data storage section 14 by the process check section 13.

Meanwhile, when machining information is set by the machining information setting section 20 and stored in the machining information storage section 21, CL data for 2-axis machining or 2.5-axis machining is generated by the CL data generating section 22 and stored in the CL data storage section 14.

The CL data stored in the CL data storage section 14 are edited by the CL data editing section 25 if necessary. Thereafter, one or a plurality of CL data is selected by the CL data selecting section 26, and then an NC program is generated by the NC program generating section 31 based on the selected CL data, the reference data stored in the reference data storage section 30, and the parameters stored in the parameter storage section 53.

At this time, the set values of the parameters stored in the parameter storage section 53 are referred to based on the reference data stored in the reference data storage section 30, thereby checking whether the machining condition data included in the CL data is suitable. When it is not suitable, the machining condition data is corrected based on the set values of the parameters, and then an NC program is generated.

In this way, an NC program including command values that are suitable in relation to the set values of the parameters is generated and stored in the NC program storage section 32. The NC program stored in the NC program storage section 32 is executed by the drive control section 55 or is output to the outside by the output device 61.

As described above, the generated NC program includes only command values that are suitable in relation to the set values of the parameters, therefore, a workpiece can be machined without an alarm process being performed by the drive control section 55.

Thus, according to the programming apparatus 1 of the present embodiment, the machining condition data included in the CL data is compared with the parameters stored in the parameter storage section 53, thereby determining whether the machining condition data in the CL data is suitable in relation to the set values of the parameters. When the determination is made that it is not suitable, the machining condition data is corrected and then an NC program is generated. Therefore, an NC program in which the parameters are reflected, that is, an NC program including command values that are suitable in relation to the set values of the parameters can be generated. Therefore, it is possible to prevent the machining of a workpiece from being stopped on the way by an alarm process caused by an NC program including command values that are unsuitable in relation to the set values of the parameters executed by the drive control section 55. Further, it is possible to efficiently generate an NC program having no problem because operations for checking and correcting the generated NC program are not necessary.

Further, since an NC program is generated while referring to the parameters in the parameter storage section 53 that are used when the drive control section 55 controls the operating mechanism 52, it is possible to always refer to the latest parameters and then generate an NC program, and thereby, it is possible to surely generate a suitable NC program.

Thus, one embodiment of the present invention has been described. However, specific modes in which the present invention can be realized are not limited thereto.

Figure 5:
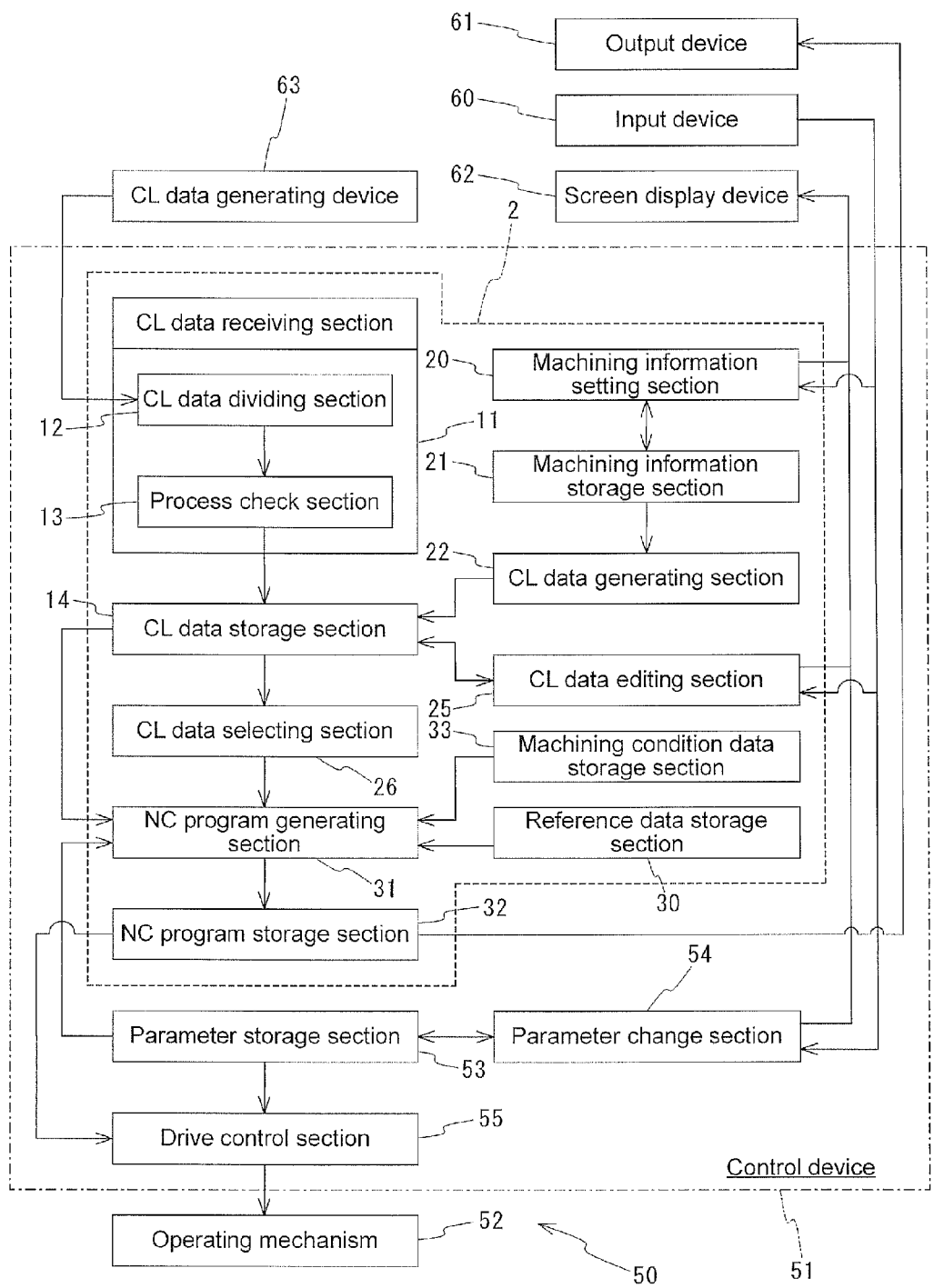
FIG. 5 is a block diagram showing a schematic configuration of a programming apparatus according to another embodiment of the present invention.

In the above embodiment, data relating to machining conditions is included in the CL data generated by the CL data generating device 63 and received by the CL data receiving section 11. However, the CL data receiving section 11 may be configured to receive CL data including only data relating to moving positions of tools. In this case, a programming apparatus 2 is configured as shown in FIG. 5.

The programming apparatus 2 has a machining condition data storage section 33 for storing data relating to machining conditions. Such machining conditions refer to, similarly to the above, a feed speed of a tool, a rotational speed of a spindle, whether or not coolant is supplied, etc., and are set for each tool, for example.

Figure 6:
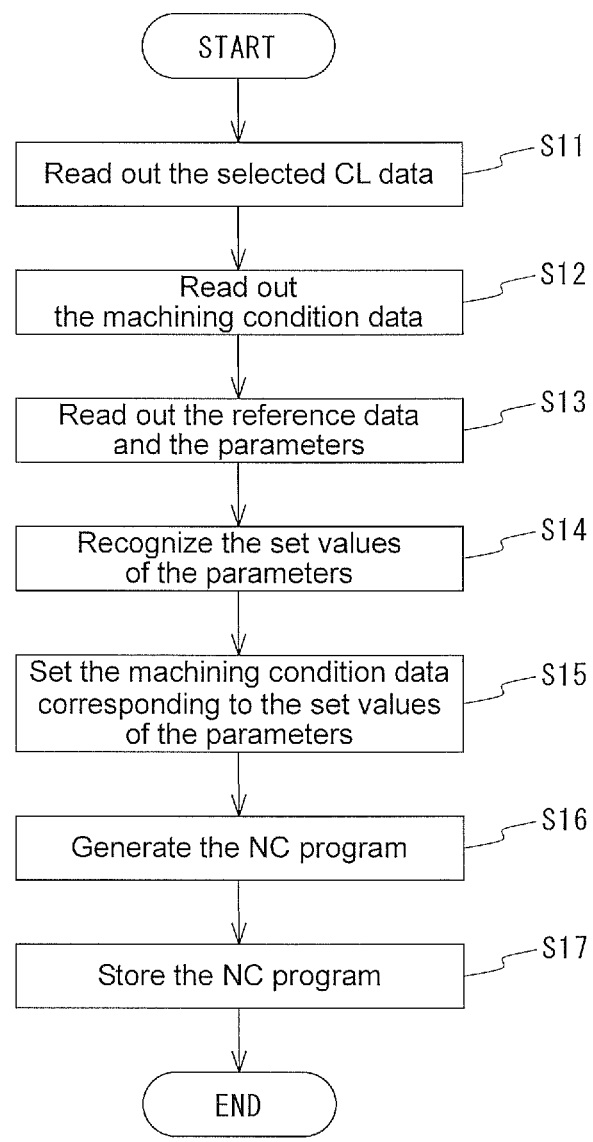
FIG. 6 is a flowchart showing a series of processes in an NC program generating section according to another embodiment of the present invention.

The NC program generating section 31 generates an NC program in the following way. That is, as shown in FIG. 6, the NC program generating section 31, first, reads out the CL data selected by the CL data selecting section 26 from the CL data storage section 14 (step S11), and reads out the machining condition data stored in the machining condition data storage section (step S12).

Next, the NC program generating section 31 reads out the reference data stored in the reference data storage section 30 and the parameters stored in the parameter storage section 53 (step S13), and recognizes the set values of the parameters that correspond to the items to be referred to based on the reference data and parameters read out (step 14).

Thereafter, based on the CL data read out, machining condition data read out, and set values of the parameters that correspond to machining conditions among the items to be referred to, the NC data generating section 31 sets machining condition data corresponding to the set values of these parameters (step S15). And the NC data generating section 31 generates an NC program based on the CL data read out, the set machining condition data, and the set values of the parameters except the parameters that correspond to machining conditions among the items to be referred to (step S16). And the generated NC program is stored in the NC program storage section 32 (step S17) and the above-described series of processes is terminated.

It is noted that setting machining condition data corresponding to the set values of the parameters refers to, for example, setting a feed speed of a tool to be equal to or less then the maximum feed speed, or, setting a rotational speed of a spindle to be equal to or less than the maximum rotational speed.

Therefore, also when the programming apparatus 2 is configured in this way, an NC program in which the parameters are reflected, that is, an NC program including command values that are suitable in relation to the set values of the parameters can be generated. Therefore, it is possible to prevent the machining of a workpiece from being stopped on the way by an alarm process caused by an NC program including command values that are unsuitable in relation to the set values of the parameters being executed by the drive control section 55. Further, it is possible to efficiently generate a NC program having no problem because operations for checking and correcting the generated NC program are not necessary.

The CL data generating device 63 may be configured to generate not only CL data for 5-axis machining but CL data for all types of machining such as 2-axis machining and 2.5-axis machining. Further, the CL data generating section 22 may be configured to generate not only CL data for 2-axis machining and 2.5-axis machining but CL data for all types of machining such as 5-axis machining. In the case where the CL data generating section 22 can generate CL data for all types of machining, the CL data generating device 63 is not necessary to be connected to the control device 51. In addition, in the case where the CL data generating device 63 is connected to the control device 51, it is possible to employ a configuration in which CL data that cannot be generated by the CL data generating section 22 is generated by the CL data generating device 63.

REFERENCE SIGNS LIST

1 Programming apparatus
11 CL data receiving section
12 CL data dividing section
13 Process check section
14 CL data storage section
30 Reference data storage section
31 NC program generating section
32 NC program storage section
50 NC machine tool
51 Control device
52 Operating mechanism
53 Parameter storage section
55 Drive control section

CITATION LIST

Patent Literature
Japanese Unexamined Patent Application Publication No. 2003-177810

The invention claimed is:
1. A programming apparatus for generating an NC (Numerical Control) program which is used in an NC machine tool having an operating mechanism for relatively moving a tool and a workpiece and a control device for controlling the operating mechanism, the programming apparatus comprising:
a parameter storage section for storing parameters related to the operation control of the operating mechanism;

a CL (Cutter Location) data storage section for storing CL data including at least data relating to the moving position of the tool and data relating to machining conditions;

an NC program generating section for generating the NC program on the basis of the CL data stored in the CL data storage section; and an NC program storage section for storing the NC program generated by the NC program generating section, wherein the parameters include at least parameters relating to the maximum feed speed of the tool and the maximum rotational speed of a spindle on the NC machine tool, the machining condition data includes at least data relating to a feed speed of the tool and a rotational speed of the spindle, and the NC program generating section compares the parameters relating to the maximum feed speed of the tool and the maximum rotational speed of the spindle stored in the parameter storage section with the feed speed of the tool and the rotational speed of the spindle included in the CL data, when determining that the feed speed and the rotational speed in the CL data do not exceed the maximum feed speed and the maximum rotational speed, respectively, generates the NC program based on the CL data, and when determining that they exceed the maximum feed speed and the maximum rotational speed, respectively, corrects the feed speed and rotational speed in the CL data so that they are equal to or lower than the maximum feed speed and the maximum rotational speed, respectively, and generates the NC program based on the corrected CL data.

2. The programming apparatus according to claim 1, wherein the programming apparatus is provided in the control device.

3. The programming apparatus according to claim 1, wherein the CL data storage section is configured so that CL data generated in an external CL data generating device can be stored therein.

4. The programming apparatus according to claim 2, wherein the CL data storage section is configured so that CL data generated in an external CL data generating device can be stored therein.

* * * * *